(12) United States Patent
Mukherjee

(10) Patent No.: US 6,757,811 B1
(45) Date of Patent: Jun. 29, 2004

(54) SLACK FETCH TO IMPROVE PERFORMANCE IN A SIMULTANEOUS AND REDUNDANTLY THREADED PROCESSOR

(75) Inventor: Shubhendu S. Mukherjee, Framingham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 09/584,034

(22) Filed: May 30, 2000

Related U.S. Application Data
(60) Provisional application No. 60/198,530, filed on Apr. 19, 2000.

(51) Int. Cl.[7] .................................................. G06F 9/00
(52) U.S. Cl. ......................... 712/220; 710/34; 714/11
(58) Field of Search .................... 710/34, 57; 712/220, 712/223; 714/11

(56) References Cited

U.S. PATENT DOCUMENTS

| | | | |
|---|---|---|---|
| 5,758,142 A | | 5/1998 | McFarling et al. |
| 5,904,732 A | * | 5/1999 | Greenley et al. ............. 710/57 |
| 5,933,860 A | | 8/1999 | Emer et al. ................. 711/213 |

OTHER PUBLICATIONS

Rotenberg, Eric, "ArSMT: A Microarchitecutal Approach to Fault Tolerance in Microprocessors", 29th Int'l Symp. on Fault–Tolerant Computing, Jun. 1999, 8 pages.(see attached reference page).*
Shen et al, "Scheduling polices fro fault tolerance in a VLSI processor", Defect and Fault Tolerance in VLSI Systems, 1994 Proceedings., The IEEE International Workshop on Oct. 17, 1994–Oct. 19, 1994, Montreal, pp. 1–9.*
Hsu et al, "Time–redundant multiple computation for fault–tolerant digital neural networks", Circuits and Systems, 1995. ISCAS '95., 1995 IEEE International Symposium on Apr. 28, 1995–May 3, 1995, Seattle, WA, vol. 2, pp. 977–980.*

*Exploiting Choice: Instruction Fetch and Issue on an Implementable Simultaneous Multithreading Processor*, D.M. Tullsen, S.J. Eggers, J.S. Emer, H.M. Levy, J.L. Lo and R.L. Stamm, Proceedings of the 23[re] Annual International Symposium on Computer Architecture, Philadelphia, PA, May, 1996 (12p.).

\* cited by examiner

*Primary Examiner*—Eddie Chan
*Assistant Examiner*—Charles Harkness

(57) ABSTRACT

A simultaneous and redundantly threaded, pipelined processor can execute the same set of instructions simultaneously as two separate threads to provide, for example, fault tolerance. One thread is processed ahead of the other thread thereby creating a "slack" between the two threads so that the instructions in one thread are processed through the processor's pipeline ahead of the corresponding instructions from the other thread. The thread, whose instructions are processed earlier, is called the "leading" thread. The other thread is the "trailing" thread. By setting the amount of slack appropriately, all or at least some of the cache misses or branch misspeculations encountered by the trailing thread can be resolved by the time the corresponding instructions from the trailing thread are fetched and processed through the pipeline. The invention, therefore, improves the performance of a fault tolerant, simultaneous and redundantly threaded processor.

25 Claims, 2 Drawing Sheets

SLACK FETCH TO IMPROVE PERFORMANCE IN A SIMULTANEOUS AND REDUNDANTLY THREADED PROCESSOR

CROSS-REFERENCE TO RELATED APPLICATIONS

This application is a non-provisional application claiming priority to U.S. provisional application Serial No. 60/198,530 filed on Apr. 19, 2000, entitled "Transient Fault Detection Via Simultaneous Multithreading," the teachings of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to microprocessors. More particularly, the present invention relates to a pipelined, multithreaded processor that can process the same instruction set in at least two separate threads. More particularly still, the invention relates to imposing "slack" between corresponding instructions in the threads of a multithreaded processor to improve the processor's performance.

2. Background of the Invention

Solid state electronics, such as microprocessors, are susceptible to transient hardware faults. For example, cosmic rays can alter the voltage levels that represent data values in microprocessors, which typically include tens or hundreds of thousands of transistors. Cosmic radiation can change the state of individual transistors causing faulty operation. Faults caused by cosmic radiation typically are temporary and the transistors eventually switch back to their normal state. The frequency of such transient faults is relatively low—typically less than one fault per year per thousand computers. Because of this relatively low failure rate, making computers fault tolerant currently is attractive more for mission-critical applications, such as online transaction processing and the space program, than computers used by average consumers. However, future microprocessors will be more prone to transient fault due to their smaller anticipated size, reduced voltage levels, higher transistor count, and reduced noise margins. Accordingly, even low-end personal computers may benefit from being able to protect against such faults.

One way to protect solid state electronics from faults resulting from cosmic radiation is to surround the potentially effected electronics by a sufficient amount of concrete. It has been calculated that the energy flux of the cosmic rays can be reduced to acceptable levels with six feet or more of concrete surrounding the computer containing the chips to be protected. For obvious reasons, protecting electronics from faults caused by cosmic ray with six feet of concrete usually is not feasible. Further, computers usually are placed in buildings that have already been constructed without this amount of concrete. Other techniques for protecting microprocessors from faults created by cosmic radiation also have been suggested or implemented.

Rather than attempting to create an impenetrable barrier through which cosmic rays cannot pierce, it is generally more economically feasible and otherwise more desirable to provide the effected electronics with a way to detect and recover from a fault caused by cosmic radiation. In this manner, a cosmic ray may still impact the device and cause a fault, but the device or system in which the device resides can detect and recover from the fault. This disclosure focuses on enabling microprocessors (referred to throughout this disclosure simply as "processors") to recover from a fault condition. One technique, such as that implemented in the Compaq Himalaya system, includes two identical "lockstepped" microprocessors. Lockstepped processors have their clock cycles synchronized and both processors are provided with identical inputs (i.e., the same instructions to execute, the same data, etc.). A checker circuit compares the processors' data output (which may also include memory addressed for store instructions). The output data from the two processors should be identical because the processors are processing the same data using the same instructions, unless of course a fault exists. If an output data mismatch occurs, the checker circuit flags an error and initiates a software or hardware recovery sequence. Thus, if one processor has been affected by a cosmically-created fault, its output likely will differ from that of the other synchronized processor. Although lockstepped processors are generally satisfactory for creating a fault tolerant environment, implementing fault tolerance with two processors takes up valuable real estate.

A pipelined, simultaneous multithreaded, out-of-order processor generally can be lockstepped. A "pipelined" processor includes a series of functional units (e.g., fetch unit, decode unit, execution units, etc.), arranged so that several units can be simultaneously processing an appropriate part of several instructions. Thus, while one instruction is being decoded, an earlier fetched instruction can be executed. A "simultaneous multithreaded" ("SMT") processor permits instructions from two or more different program threads (e.g., applications) to be processed through the processor simultaneously. An "out-of-order" processor permits instructions to be processed in an order that is different than the order in which the instructions are provided in the program (referred to as "program order"). Out-of-order processing potentially increases the throughput efficiency of the processor. Accordingly, an SMT processor can process two programs simultaneously. It is generally possible to cycle lock step on SMT processor.

An SMT processor can be modified so that the same program is simultaneously executed in two separate threads to provide fault tolerance within a single processor. Such a processor is called a simultaneously and redundantly threaded ("SRT") processor. Some of the modifications to turn a SMT processor into an SRT processor are described in U.S. Provisional Application Serial No. 60/198,530. Executing the same program in two different threads permits the processor to detect faults such as may be caused by cosmic radiation, noted above. By comparing the output data from the two threads at appropriate times and locations within the SRT processor, it is possible to detect whether a fault has occurred. For example, data written to cache memory or registers that should be identical from corresponding instructions in the two threads can be compared. If the output data matches, there is no fault. Alternatively, if there is a mismatch in the output data, a fault has occurred in one or both of the threads.

Executing the same program in two separate threads advantageously affords the SRT processor some degree of fault tolerance, but also may cause several performance problems. For instance, any latency caused by a cache miss is exacerbated. Cache misses occur when an instruction requests data from memory that is not also available in cache memory. The processor first checks whether the requested data already resides in the faster access cache memory, which generally is onboard the processor die. If the requested data is not present in cache (a condition referred to as a cache "miss"), then the processor is forced to retrieve the data from main system memory which takes more time, thereby causing latency, than if the data could have been retrieved from the faster onboard cache. Because the two threads are executing the same instructions, any instruction in one thread that results in a cache miss will also experience the same cache miss when that same instruction is executed in other thread. That is, the cache latency will be present in both threads.

A second performance problem concerns branch misspeculation. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the branch instruction is fetched by the fetch unit in the processor. In order to keep the pipeline full (which is desirable for efficient operation), a pipelined processor includes branch prediction logic which predicts the outcome of a branch instruction before it is actually executed (also referred to as "speculating"). Branch prediction logic generally bases its speculation on short or long term history. As such, using branch prediction logic, a processor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the branch instruction is executed by the processor, then the next instructions to be executed have already been fetched and are working their way through the pipeline.

If, however, the branch speculation turns out to have been the wrong prediction (referred to as "misspeculation"), many or all of the instructions filling the pipeline behind the branch instruction may have to be thrown out (i.e., not executed) because they are not the correct instructions to be executed after the branch instruction. The result is a substantial performance hit as the fetch unit must fetch the correct instructions to be processed through the pipeline. Suitable branch prediction methods, however, result in correct speculations more often than misspeculations and the overall performance of the processor is improved with a suitable branch predictor (even in the face of some misspeculations) than if no speculation was available at all.

In an SRT processor that executes the same program in two different threads for fault tolerance, any branch misspeculation is exacerbated because both threads will experience the same misspeculation. Because, the branch misspeculation occurs in both threads, the processor's internal resources usable to each thread are wasted while the wrong instructions are replaced with the correct instructions.

Of course, it is always desirable to improve the efficiency in a processor. Accordingly, any increase in efficiency, and thus speed, of an SRT processor is highly desirable. Similarly, improvements in the efficiency of a simultaneous multithreaded processor capable of executing the same instruction set as two separate threads for fault tolerance also is desirable.

BRIEF SUMMARY OF THE INVENTION

The problems noted above are solved in large part by a simultaneous and redundantly threaded processor that can simultaneously execute the same program in two separate threads to provide fault tolerance. By simultaneously executing the same program twice, the system can be made fault tolerant by checking the output data pertaining to corresponding instructions in the threads to ensure that the data matches. A data mismatch indicates a fault in the processor effecting one or both of the threads. The preferred embodiment of the invention provides an increase in performance to such a fault tolerant, simultaneous and redundantly threaded processor.

In accordance with the preferred embodiment of the invention, one thread is processed ahead of the other thread thereby creating a "slack" of instructions between the two threads so that the instructions in one thread are processed through the processor's pipeline ahead of the corresponding instructions from the other thread. The thread, whose instructions are processed earlier, is called the "leading" thread, while the other thread is the "trailing" thread. By setting the amount of slack (in terms of numbers of instructions) appropriately, all or at least some of the cache misses or branch misspeculations encountered by the leading thread can be resolved before the corresponding instructions from the trailing thread are fetched and processed through the pipeline.

A cache miss in the leading thread resulting, for example, from a store instruction will cause the requested data to be stored in the cache. Then, when the same store instruction in the trailing thread is processed, the requested data will already reside in cache and no cache miss in the trailing thread will occur, thereby reducing latency. Similarly, any branch misspeculation in the leading thread will not occur in the trailing thread because the branch instruction will have been resolved in the leading thread by the time that same instruction is fetched in the trailing thread.

The amount of slack preferably is programmable. Programming more slack into the system provides the leading thread a chance to bring data into the cache and resolve branch misspeculations before the corresponding instructions in the trailing thread are processed through the processor's pipeline. However, excessively long slacks can reduce system performance. A desirable amount of slack will vary from system to system and application to application. A slack of 256 instructions, for example, has been found to significantly improve system performance.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, microprocessor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "slack" is intended to mean the number of instructions that one thread is ahead of another thread that is executing the same instruction set. For example, a slack of 256 instructions means that the processor will give one thread a 256 instruction "head start" over another thread having the same instruction set in terms of fetching instructions. Accordingly, the processor will not fetch the first instruction from the delayed thread until the processor has fetched the $256^{th}$ instruction from the leading thread.

DETAILED DESCRIPTION OF THE PREFERRED EMBODIMENTS

Figure 1:
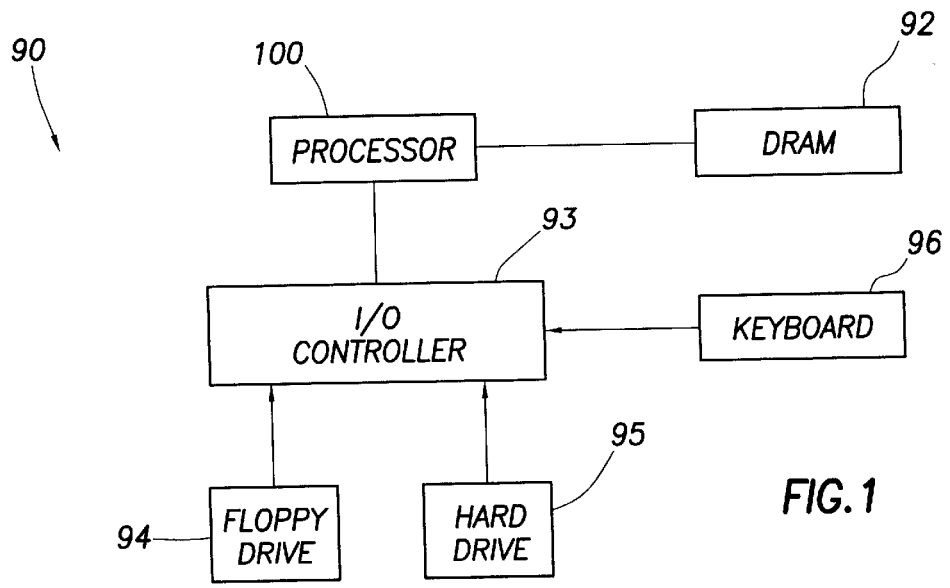
FIG. 1 is a diagram of a computer system constructed in accordance with the preferred embodiment of the invention and including a simultaneous and redundantly threaded processor.

FIG. 1 shows a computer system 90 including a pipelined, simultaneous and redundantly threaded ("SRT") processor 100 constructed in accordance with the preferred embodiment of the invention. Besides processor 100, computer system 90 also includes dynamic random access memory ("DRAM") 92, an input/output ("I/O") controller 93, and various I/O devices which may include a floppy drive 94, a hard drive 95, a keyboard 96, and the like. The I/O controller 93 provides an interface between processor 100 and the various I/O devices 94–96. The DRAM 92 can be any suitable type of memory devices such as RAMBUS™ memory. In addition, SRT processor 100 may also be coupled to other SRT processors if desired in a commonly known "Manhattan" grid, or other suitable architecture.

Figure 2:
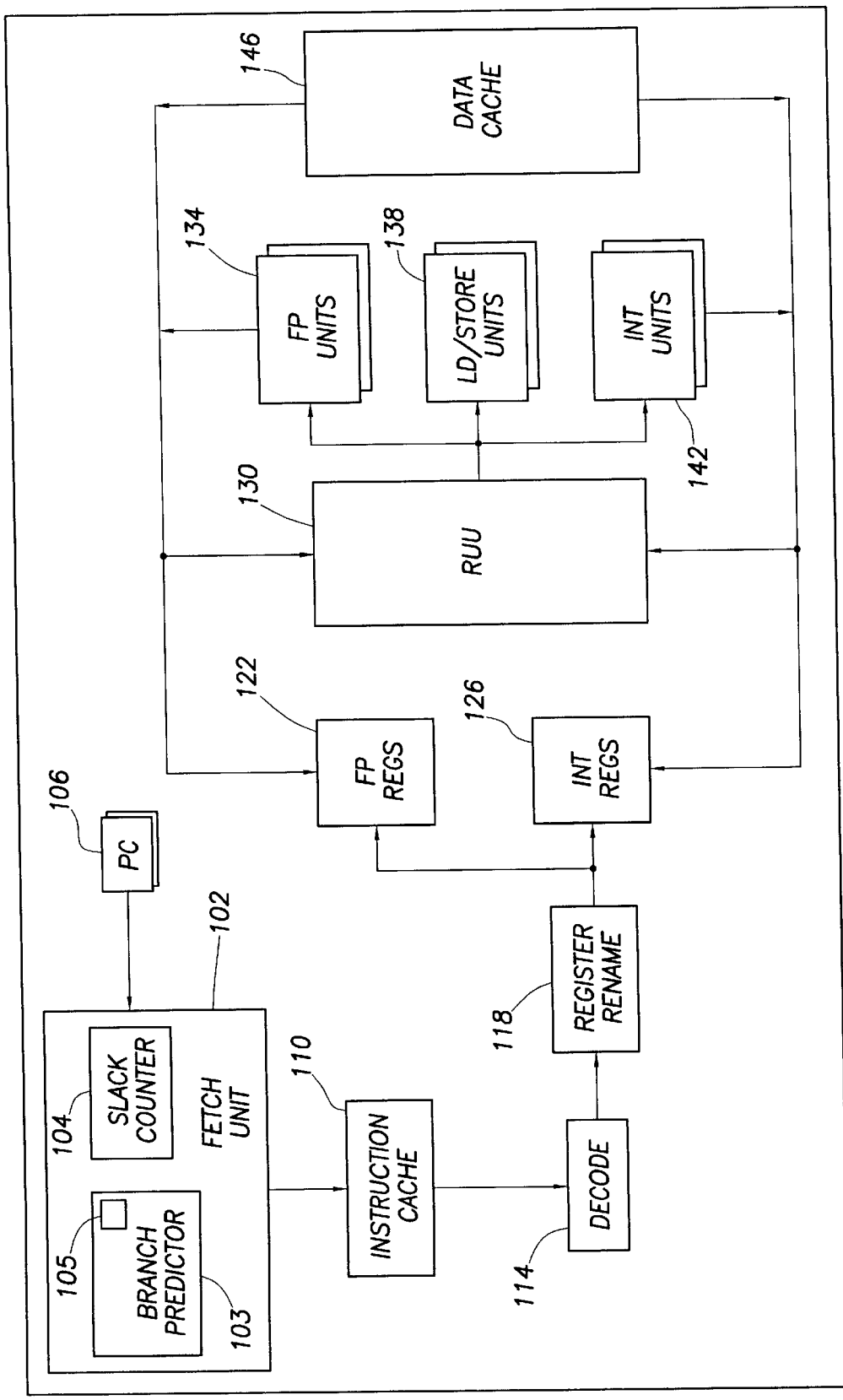
FIG. 2 is a block diagram of the simultaneous and redundantly threaded processor from FIG. 1 in accordance with the preferred embodiment that includes a slack counter that maintains a slack of instructions between at least two threads.

FIG. 2 shows the SRT processor 100 of FIG. 1 in greater detail. Referring to FIG. 2, processor 100 preferably comprises a pipelined architecture which includes a series of functional units, arranged so that several units can be simultaneously processing appropriate part of several instructions. As shown, the exemplary embodiment of processor 100 includes a fetch unit 104, one or more program counters 106, an instruction cache 110, decode logic 114, register rename logic 118, floating point and integer registers 122, 126, a register update unit 130, execution units 134, 138, and 142, and a data cache 146.

Fetch unit 102 uses a program counter 106 for assistance as to which instruction to fetch. Being a multithreaded processor, the fetch unit 102 preferably can simultaneously fetch instructions from multiple threads. A separate program counter 106 is associated with each thread. Each program counter 106 is a register that contains the address of the next instruction to be fetched from the corresponding thread by the fetch unit 102. FIG. 2 shows two program counters 106 to permit the simultaneous fetching of instructions from two threads. It should be recognized, however, that additional program counters can be provided to fetch instructions from more than two threads simultaneously.

As shown, fetch unit 102 includes branch prediction logic 103 and a "slack" counter 104. The slack counter 104 will be described in greater detail below. The branch prediction logic 104 permits the fetch unit 102 to speculate ahead on branch instructions as noted above. In order to keep the pipeline full (which is desirable for efficient operation), the branch predictor logic 103 speculates the outcome of a branch instruction before the branch instruction is actually executed. Branch predictor 103 generally bases its speculation on previous instructions. Any suitable speculation algorithm can be used in branch predictor 103.

Referring still to FIG. 2, instruction cache 110 provides a temporary storage buffer for the instructions to be executed. Decode logic 114 retrieves the instructions from instruction cache 110 and determines the type of each instruction (e.g., add, subtract, load, store, etc.). Decoded instructions are then passed to the register rename logic 118 which maps logical registers onto a pool of physical registers.

The register update unit (RUU) 130 provides an instruction queue for the instructions to be executed. The RUU 130 serves as a combination of global reservation station pool, rename register file, and reorder buffer. The RUU 130 breaks load and store instructions into an address portion and a memory (i.e., register) reference. The address portion is placed in the RUU 130, while the memory reference portion is placed into a load/store queue (not specifically shown in FIG. 2).

The floating point register 122 and integer register 126 are used for the execution of instructions that require the use of such registers as is known by those of ordinary skill in the art. These registers 122, 126 can be loaded with data from the data cache 146. The registers also provide their contents to the RUU 130.

As shown, the execution units 134, 138, and 142 comprise a floating point execution unit 134, a load/store execution unit 138, and an integer execution unit 142. Each execution unit performs the operation specified by the corresponding instruction type. Accordingly, the floating point execution units 134 execute floating instructions such as multiply and divide instruction while the integer execution units 142 execute integer-based instructions. The load/store units 138 perform load operations in which data from memory is loaded into a register 122 or 126. The load/store units 138 also perform store operations in which data from registers 122, 126 is written to data cache 146 and/or DRAM memory 92 (FIG. 1).

The architecture and components described herein are typical of microprocessors, and particularly pipelined, multithreaded processors. Numerous modifications can be made from that shown in FIG. 2. For example, the locations of the RUU 130 and registers 122, 126 can be reversed if desired. For additional information, the following references, all of which are incorporated herein by reference, may be consulted for additional information if needed: U.S. patent application Ser. No. 08/775,553, filed Dec. 31, 1996. and "Exploiting Choice: now U.S. Pat. No. 6,073,159 issued on Jun. 6, 2000. Instruction Fetch and Issue on an Implementable Simultaneous Multithreaded Processor," by D. Tullsen, S. Eggers, J. Emer, H. Levy, J. Lo and R. Stamm, Proceedings of the $23^{rd}$ Annual International Symposium on Computer Architecture, Philadelphia, Pa., May 1996.

The preferred embodiment of the invention provides a performance enhancement to SRT processors. The preferred SRT processor 100 described above is capable of processing instructions from two different threads simultaneously. Such a processor in fact can be made to execute the same program as two different threads. In other words, the two threads contain the same exact set of program. Processing the same program through the processor in two different threads permits the processor to detect faults caused by cosmic radiation as noted above. The disadvantage of such a fault tolerant processor is that cache misses and branch misspeculations cause performance problems as noted above. The preferred embodiment of the invention solves these problems thereby providing a substantial performance increase in an SRT processor.

Figure 3:
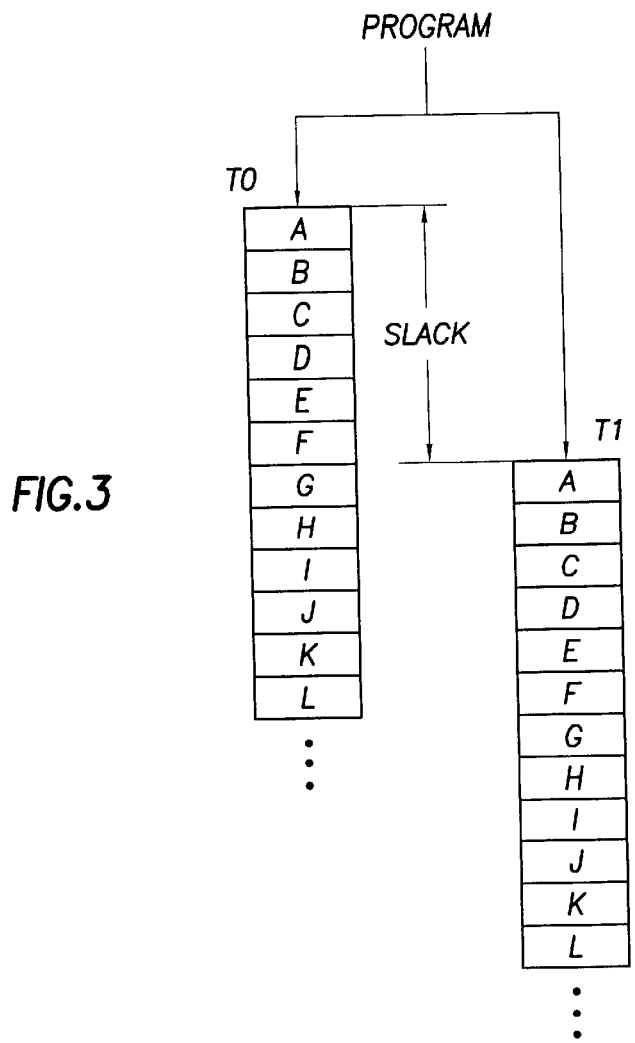
FIG. 3 conceptually illustrates the performance benefit achieved by the multithreaded processor of FIGS. 1 and 2 from its ability to simultaneously execute two threads containing the same instruction set but with one thread trailing the other thread.

Referring still to FIG. 2, fetch unit 102 preferably includes a "slack" counter 104. Slack counter 104 is used to create a delay of a desired number of instructions between the two threads including the same instruction set. The delay is referred to herein as a "slack." The description of and advantage of the slack will now be explained with reference to FIG. 3 followed by a discussion of how the slack counter 104 is used to create the slack. FIG. 3 shows a single program that is copied by fetch unit 102 (FIG. 2) into two threads—thread T0 and thread T1. Both threads include instructions A–L as shown, and perhaps more. Thread T0 is arbitrarily designated as the "leading" thread while thread T1 is designated as the "trailing" thread. As shown in the conceptual drawing of FIG. 3, the instructions in trailing thread T1 begin their way through the pipeline of processor 100 six instructions behind or after leading thread T0. Thus, while processor 100 begins fetching and processing instructions A, B, C, etc. from leading thread T0, the fetch unit 102 of processor 100 will not begin fetching instruction A from the trailing thread T1 until the fetch unit 102 has already fetched the first six instructions from the leading thread. As explained below, the slack advantageously provides a substantial performance improvement to the multithreaded processor art.

Referring to FIGS. 2 and 3, once a branch instruction has executed in an execution unit 134, 138, 142, a register 105 in the branch predictor logic 103 is updated with the correct result of the branch. Thus, register 105 will indicate the correct direction of program execution following the branch instruction. Because of the slack between the two threads, some or all branch instructions in the leading thread preferably will be resolved before the corresponding branch instructions from the trailing thread T1 are fetched. When fetching a branch instruction from the trailing thread, the fetch unit preferably probes the register 105 in the branch predictor logic 103 to determine if that particular branch instruction from the leading thread has already been fetched and resolved. If so, branch speculation is unnecessary for the branch instruction in the trailing thread—the leading thread has already determined the next instruction to execute after the branch instruction. As such, speculation of trailing thread branch instructions generally is unnecessary because the correct outcome of the branch instruction will already be known from its execution in the leading thread. Accordingly, the latency caused by branch misspeculation is avoided in the trailing thread.

Similarly, because of the slack cache misses can be avoided in the trailing thread. Some or all cache misses in the leading thread will result in the requested data being written to the processor's data cache 146. When that same instruction is processed in the trailing thread, the requested data will already be present in data cache 146 thereby a cache miss in the trailing thread and eliminating the latency such a cache miss would have caused.

In short, the introduction of slack permits the leading thread to resolve all or most branch misspeculations and cache misses so that the corresponding instructions in the trailing thread will not experience the same latency problems. Thus, the introduction of slack into the simultaneous multithreaded operation achieves at least two performance benefits—reducing the frequency of cache misses and branch misspeculations in the trailing thread.

The use of the slack counter 104 to create the instruction slack between the leading and trailing threads will now be described. The slack counter 104 preferably is a signed counter that is decremented when the leading thread T0 commits an instruction ("committing" an instruction refers to the process of completing the execution of and retiring an instruction). Further, the counter is incremented when the trailing thread commits an instruction. The counter 104 preferably is initialized at system reset to the target slack. The fetch policy implemented by the fetch unit 102 preferably is to give priority to the thread that generally has the fewest number of instructions in the instruction cache 110, decode 114, and register rename 118. This fetch policy can be implemented by fetching instructions from the thread whose program counter 106 has a lower value than the other program counter associated with the other thread. More specifically, the fetch policy is implemented by adding the count value of slack counter 104 to the program counter value associated with the trailing thread and comparing that sum to the program counter value of the leading thread. By adding the count value of slack counter 104 in each cycle to the trailing thread's program count, the fetch policy will favor the leading thread (i.e., fetch instructions from the leading thread) until the target slack is reached. This process automatically guides the fetch unit 102 to maintain the desired instruction slack.

The amount of slack in the example of FIG. 3 is six instructions. In general, the amount of slack can be any desired number of instructions. For example, as shown in U.S. Provisional patent application 60/198,530 filed on Apr. 19, 2000, a slack of 256 instructions was shown to provide a 10% performance increase. The amount of slack can be preset or programmable by the user of computer system 90 and preferably is large enough to permit the leading thread to resolve some, most, or all cache misses and branch misspeculations before the corresponding instructions from the trailing thread are executed. It will also be understood by one of ordinary skill in the art that, in certain situations, the two threads will have to synchronized thereby reducing the slack to zero. Examples of such situations include uncached loads and external interrupts.

Accordingly, the preferred embodiment of the invention provides a significant performance increase of an SRT processor that can execute the same instruction set in two different threads. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
    a pipelined, simultaneous and redundantly threaded (SRT) processor;
    an I/O controller coupled to said processor;
    an I/O device coupled to said I/O controller; and
    an main system memory coupled to said processor;
    wherein said SRT processor processes a set of instructions in a leading thread and also in a trailing thread, and wherein the instructions in the trailing thread are substantially identical to the instructions in the leading thread, and wherein by action of a slack counter, the instructions in the trailing thread beginning processing through the processor after the corresponding instructions in the leading thread begin processing through the processor.

2. The computer system of claim 1 wherein the slack counter has an output count value, said slack counter decrements when the leading thread commits an instruction and increments when the trailing thread commits an instruction thereby maintaining a target slack of instructions, said target slack comprising an approximately constant number of instructions of separation between corresponding instructions in the leading and trailing threads.

3. The computer system of claim 2 wherein said slack counter comprises a signed counter.

4. The computer system of claim 2 wherein said SRT includes a fetch unit to fetch instructions from each thread and said slack counter is included as part of said fetch unit.

5. The computer system of claim 2 wherein said slack counter is initialized during computer system initialization to the target slack value.

6. The computer system of claim 4 wherein said slack counter is initialized during computer system initialization to the target slack value.

7. The computer system of claim 5 wherein said SRT comprises a fetch unit that implements a fetch policy wherein priority is given to the thread with the fewest number of instructions that have been fetched by the fetch unit, but not yet executed.

8. The computer system of claim 7 wherein said multithreaded processor further includes a pair of program counters, one program counter associated with each thread, said program counters being coupled to said slack counter, and said fetch unit adds the count value from the slack counter to the program counter associated with the trailing thread so that the fetch unit will fetch instructions from the leading thread until the target slack is reached.

9. The computer system of claim 2 wherein said target slack is programmable.

10. The computer system of claim 2 wherein said target slack is 256 instructions.

11. A pipelined, simultaneous and redundantly threaded (SRT) processor, comprising:
    a fetch unit that fetches instructions from a plurality of threads of instructions;
    an instruction cache coupled to said fetch unit and storing instructions to be decoded and executed; and
    decode logic coupled to said instruction cache to decode the type of instructions stored in said instruction cache;
    wherein said processor processes a set of instructions in a leading thread and also in a trailing thread, and wherein the instructions in the trailing thread are substantially identical to the instructions in the leading thread; and
    wherein, via a slack counter, the instructions in the trailing thread begin processing through the processor after the corresponding instructions in the leading thread begin processing through the processor.

12. The SRT processor of claim 11 wherein the slack counter provides an output count value, said slack counter decrements when the leading thread commits an instruction and increments when the trailing thread commits an instruction thereby maintaining a target slack of instructions, said target slack comprising an approximately constant number of instructions of separation between corresponding instructions in the leading and trailing threads.

13. The SRT processor of claim 12 wherein said slack counter comprises a signed counter.

14. The SRT processor of claim 12 wherein said processor includes a fetch unit to fetch instructions from each thread and said slack counter is included as part of said fetch unit.

15. The SRT processor of claim 12 wherein said slack counter is initialized during computer system initialization to the target slack value.

16. The SRT processor of claim 14 wherein, during initialization of said multithreaded processor, said slack counter is initialized to the target slack value.

17. The SRT processor of claim 15 wherein said fetch unit implements a fetch policy wherein priority is given to the thread with the fewest number of instructions that have been fetched by the fetch unit, but not yet executed.

18. The SRT processor of claim 17 wherein said processor further includes a pair of program counters, one program counter associated with each thread, said program counters being coupled to said slack counter, and said fetch unit adds the count value from the slack counter to the program counter associated with the trailing thread so that the fetch unit will fetch instructions from the leading thread until the target slack is reached.

19. The SRT processor of claim 12 wherein said target slack is programmable.

20. The SRT processor of claim 12 wherein said target slack is 256 instructions.

21. A method of fetching instructions in an SRT processor which can fetch and execute a set of instructions in two separate threads so that each thread includes substantially the same instructions as the other thread, one of said threads being a leading thread and the other of said threads being a trailing thread, the method comprising:
    initializing a slack counter having an output count value to a target slack value that represents a number of instructions of separation between corresponding instructions in the leading and trailing threads;
    decrementing said slack counter when the leading thread commits an instruction;
    incrementing said slack counter when the trailing thread commits an instruction;
    adding the output count value from the slack counter to a program count value of a program counter associated with the trailing thread to produce a sum; and
    fetching an instruction from the leading thread if the difference between the sum and a program count value of a program counter associated with the leading thread is less than the target slack.

22. The method of claim 21 wherein initializing a slack counter includes initializing the slack counter to a target slack of 256 instructions.

23. The method of claim 21 further including fetching an instruction from the trailing thread if the difference between the sum and the program count value of the program counter associated with the leading thread is greater than the target slack.

24. An electronic system, comprising:
    a pipelined, simultaneous and redundantly threaded (SRT) processor, and
    an main system memory coupled to said processor;
    wherein said SRT processor processes a set of instructions in a leading thread and also in a trailing thread, and wherein the instructions in the trailing thread are substantially identical to the instructions in the leading thread, and wherein by action of a counter, the instructions in the trailing thread are delayed from processing through the processor relative to corresponding instructions in the leading thread.

25. The electronic system of claim 24 wherein the counter is programmable.

* * * * *